United States Patent
Kim et al.

(10) Patent No.: US 8,654,901 B2
(45) Date of Patent: Feb. 18, 2014

(54) DECODING APPARATUS, DECODING METHOD, AND COMPUTER-READABLE STORAGE MEDIUM

(75) Inventors: Hyun Gyu Kim, Seoul (KR); Sin Wook Lee, Seoul (KR); Hwa Seon Shin, Seongnam (KR); Sang Heon Lee, Daegu (KR); Byeong Ho Choi, Yongin (KR); Chung Ku Lee, Incheon (KR); Euee Seon Jang, Seoul (KR)

(73) Assignee: Korea Electronics Technology Institute, Seongnam (KR)

( * ) Notice: Subject to any disclaimer, the term of this patent is extended or adjusted under 35 U.S.C. 154(b) by 294 days.

(21) Appl. No.: 13/123,712

(22) PCT Filed: Oct. 9, 2009

(86) PCT No.: PCT/KR2009/005801
§ 371 (c)(1),
(2), (4) Date: Apr. 11, 2011

(87) PCT Pub. No.: WO2010/041906
PCT Pub. Date: Apr. 15, 2010

(65) Prior Publication Data
US 2011/0194654 A1  Aug. 11, 2011

(30) Foreign Application Priority Data
Oct. 11, 2008  (KR) .......................... 10-2008-0099907

(51) Int. Cl.
H04L 27/06 (2006.01)

(52) U.S. Cl.
USPC .......................................................... 375/340

(58) Field of Classification Search
None
See application file for complete search history.

(56) References Cited

U.S. PATENT DOCUMENTS

2002/0076211 A1  6/2002  Luman
2002/0140857 A1  10/2002  Limaye
2003/0156650 A1  8/2003  Campisano et al.
2003/0227969 A1*  12/2003  Wise et al. ................. 375/240.1
2004/0190635 A1*  9/2004  Ruehle .......................... 375/253

FOREIGN PATENT DOCUMENTS

KR  1020090002508 A  1/2009

OTHER PUBLICATIONS

Text of ISO/IEC FCD 23001-4: Codec Configuration Representation, Apr. 2008.

(Continued)

*Primary Examiner* — Dave Czekaj
*Assistant Examiner* — Nam Pham
(74) *Attorney, Agent, or Firm* — Sughrue Mion, PLLC (57) ABSTRACT

Provided are a decoding apparatus and method. The decoding apparatus includes a repository and a configuration unit. The repository stores a plurality of functional units having an input port and an output port which are respectively represented as tokens. The configuration unit receives decoder description which includes an identifier of at least one of the functional units and connection relationship information between the functional units, selects each functional unit corresponding to the received identifier from the repository, and connects the selected functional units by using the token to configure a variable decoder. The decoding apparatus and method defines the connection relationships between a plurality of functional units that configure a decoder, and thus can quickly and dynamically configure a decoder suitable for various encoding schemes. Accordingly, the decoding apparatus and method enable to easily verify suitability in each level of encoding, decoding and standardization and achieve the concentration of information, thereby accelerating the progress and standardization of technologies.

11 Claims, 3 Drawing Sheets

(56) References Cited

OTHER PUBLICATIONS

Dandan Ding et al., "Video Decoder Reconfigurations and AVS Extensions in the New MPEG Reconfigurable Video Coding Framework", Oct. 8-10, 2008, p. 164-169, IEEE.

"Reconfigurable Video Coding (RVC) A New Specification and Implementation Paradigm for MPEG Codecs", Apr. 14-16, 2008.
International Search Report for PCT/KR2009/005801 filed Oct. 9, 2009.
Written Opinion of the International Searching Authority for PCT/KR2009/005801 filed Oct. 9, 2009.

* cited by examiner

DECODING APPARATUS, DECODING METHOD, AND COMPUTER-READABLE STORAGE MEDIUM

TECHNICAL FIELD

The following disclosure relates to a decoding apparatus and method and a computer-readable storage medium, and in particular, to a decoding apparatus, which decodes signals encoded in various encoding schemes by using one device, and to an encoding method.

BACKGROUND ART

In Moving Picture Experts Group (MPEG), establishing is begun of the standard for a video coding description framework, called Reconfigurable Video Coding (RVC). RVC is a technology for a codec framework that divides all sorts of video coding and decoding technologies by module and allows the divided technologies to be performed, and is a technology that increases flexibility for the use of a current video coding technology and may be easily applied to video coding technologies that is to be developed in the future.

The basic concept of RVC prepares a plurality of Functional Units (FUs) that are divided by function of performing each operation in decoding (further, coding), and performs decoding by combining suitable functional units in accordance with each coding scheme.

In relation to the functional units and a Decoding Descriptor (DD) defining the connection relationships between these, because a related art standard defines the functional units based on input/output signals (for example, input/output and control-context), it has considerable complexity. As an example, definition is differently made for each functional unit. For example, although specific inputs are basically identical, one functional unit refers to as YUV, but another functional unit refers to as YV12.

Consequently, it is difficult to actually use the functional units and to verify suitability for the connection relationships between these. That is, if the connection relationships between the functional units are verified, the possibility of connection between the functional units may be known after comparing all data characteristics, for example, the size (or type) of data, serial/parallel transmission schemes and internal algorithms.

In addition to the function or operation of the functional unit, the sizes or sequences of input/output signals are clarified. In this way, as implementation-dependent contents are included, it is difficult to analyze standard documents, and quantity increases.

Moreover, by preparing an item "internal algorithm" for defining the functional units, the internal algorithm of a functional unit is described and the meaning of an input/output signal is defined. However, this gives restriction to the manufacturer of the functional unit and provides unnecessary information to the user of the functional unit due to implementation-dependent characteristic. Accordingly, an input/output signal is not clearly provided.

Due to these limitations, difficulty occurs in a standardization operation, the writing of a decoding decoder that defines the implementation of a functional unit and the connection relationship of the functional unit is very complicated and much limited. Consequently, much difficulty exists in practical application.

DISCLOSURE OF INVENTION

Technical Problem

Accordingly, the present disclosure provides a decoding apparatus and method, which enable to simply and clearly define the connection relationships between functional units in an RVC technology, increasing a standardization speed and enabling practical application.

The present disclosure also provides a decoding apparatus and method, which dynamically reconfigure a decoding logic in run time to be suitable for each of videos that are encoded in various encoding schemes.

The present disclosure also provides a decoding apparatus and method, which enable simply and clearly to write a decoding descriptor including connection information, improving the transmission efficiency of content.

The present disclosure also provides an RVC system, which enables implementation users to implement functional units optimized for their technology characteristics by removing unnecessary restrictions in the implementation of the functional units, enhancing decoding performance.

The objects of the present invention are not limited to the above-described object, and the objects and advantages of the present invention other than the above-described object can be understood by description below and will be more apparent with reference to the embodiments of the present invention.

Solution to Problem

In one general aspect, a decoding apparatus includes: a repository storing a plurality of functional units having an input port and an output port which are respectively represented as tokens; and a configuration unit receiving decoder description which includes an identifier of at least one of the functional units and connection relationship information between the functional units, selecting each functional unit corresponding to the received identifier from the repository, and connecting the selected functional units by using the token to configure a variable decoder.

The token may correspond to data which are inputted or outputted between the functional units, and may include basic description be defined as what comprise a name or an identifier and the data.

For preparing a case in which the functional unit includes a plurality of input ports and independently operates according to an input sequence of a plurality of data which are inputted to the plurality of input ports, the decoding apparatus may further include precedence information between tokens corresponding to the plurality of input data.

Each of the functional units may be implemented to accord a serial or parallel transmission scheme and a size and transfer sequence of the data between connectable functional units.

In another general aspect, a decoding apparatus includes: a first repository storing a plurality of functional units which perform functions by operation for decoding; a configuration unit receiving connection relationship information for connection of the functional units, selecting pertinent each functional unit from the first repository on the basis of the connection relationship information, and connecting the selected functional units to configure a variable decoder; and a second repository including connection information for each of the functional units.

In another general aspect, a decoding method includes: receiving an encoded bitstream and decoder description which includes an identifier of at least one functional unit and connection information between functional units; selecting each functional unit corresponding to the identifier of the functional unit from a repository; checking a token corresponding to data which are inputted or outputted between the functional units from connection information, and connecting the selected functional units by using the checked token to configure a variable decoder for decoding the encoded bitstream; and decoding the encoded bitstream through the variable decoder.

When connection between at least one of the input port and output port of the functional unit and another functional unit is optional, the input port and output port of the functional unit may be defined as the token and option information for connection with the other functional unit.

The configuring of a variable decoder may include selectively connecting the functional units on the basis of the token and the option information.

The configuring of a variable decoder may include: extracting parser description which is included in the decoder description; generating a parsing unit according to the parser description; and connecting the generated parsing unit and the selected functional unit.

The configuring of a variable decoder may include: checking a token associated with an input or output of a functional unit from the connection information which is described in the decoder description; checking whether a corresponding token receives or outputs the checked token on the basis of a lookup table which defines connection information of the functional units; and verifying connection relationship between the functional units according to a result of the checking.

Unlike this, the variable decoder may be configured by performing: checking a token associated with the input or output of a functional unit which is described in decoder description; checking whether a corresponding functional unit may receive or output the checked token on the basis of a lookup table which defines the connection information of the functional unit; and verifying connection relationship between the functional units according to a result of the checking.

The decoding of the encoded bitstream may include: determining whether precedence information between tokens corresponding to respective input ports of a functional unit exists, for the functional unit having the input ports; determining a processing sequence of data which are inputted to the respective input ports according to the precedence information of the token, when the precedence information exists; and processing the data according to the determined processing sequence.

In another general aspect, a computer-readable storage medium storing a program which performs decoding for each operation and which combines a plurality of functional units, which are included to accord a serial or parallel transmission scheme and a size and transfer sequence of data which are transferred between the functional units, to configure a decoder, the program executing: receiving decoder description which includes an identifier of the functional unit and connection relation information which is composed of a token corresponding to data which are inputted or outputted between the functional units; selecting functional units corresponding to the identifier according to the decoder description; and combining the selected functional units according to the decoder description.

Other features and aspects will be apparent from the following detailed description, the drawings, and the claims.

Advantageous Effects of Invention

A decoding apparatus and method according to exemplary embodiments can decode videos encoded in various encoding schemes though one decoding apparatus.

The decoding apparatus and method according to exemplary embodiments define the connection relationships between functional units by using tokens, define each of the tokens by using only a name (or an identifier) and description, define the functional units through the tokens, and thus can simply and clearly define the connection relationships between the functional units, thereby enabling to develop a decoding apparatus and method to which a practical application-enabled RVC technology. Accordingly, the decoding apparatus and method according to exemplary embodiments can contribute to standardization.

The decoding apparatus and method according to exemplary embodiments easily enable to write decoder description to derive the quick distribution of an RVC technology and decrease the capacity of the decoder description, improving transmission efficiency in content transmission.

The decoding apparatus and method according to exemplary embodiments can dynamically reconfigure a reconfiguration decoder corresponding to each encoding video for a short time, and moreover, can concentrate and unify information through tokens, a token pool and an FU table.

The decoding apparatus and method according to exemplary embodiments can provide verification conditions for all three stages including an encoder level, a decoder level and a standardization level. First, the decoding apparatus and method according to exemplary embodiments can verify connection with the token information of a decoder description when writing the decoder description, in the encoder level. Moreover, the decoding apparatus and method according to exemplary embodiments include token information even in the syntax parser description of the decoder description, enabling a decoder to prepare connection.

In the decoder level, the decoding apparatus and method according to exemplary embodiments can easily verify the connection between functional units when connecting the functional units, in the analysis of decoder description.

In the standardization level, the decoding apparatus and method according to exemplary embodiments can verify the suitability of connection relationship (i.e., connectable network) when defining a new functional unit. When connection is made with only the token of a token pool, suitability is best. When defining a new token, a case of using only the new token may occur. Accordingly, because of avoiding new definition if possible and trying to reuse, technologies are accumulated. Furthermore, a necessary conformance test can be performed in a stage necessary for standardization.

As a result, the decoding apparatus and method according to exemplary embodiments enhance efficiency for the operations of the functional units, improving efficiency for decoding.

BEST MODE FOR CARRYING OUT THE INVENTION

Hereinafter, exemplary embodiments will be described in detail with reference to the accompanying drawings. Throughout the drawings and the detailed description, unless otherwise described, the same drawing reference numerals will be understood to refer to the same elements, features, and structures. The relative size and depiction of these elements may be exaggerated for clarity, illustration, and convenience. The following detailed description is provided to assist the reader in gaining a comprehensive understanding of the methods, apparatuses, and/or systems described herein. Accordingly, various changes, modifications, and equivalents of the methods, apparatuses, and/or systems described herein will be suggested to those of ordinary skill in the art. Also, descriptions of well-known functions and constructions may be omitted for increased clarity and conciseness.

In specification, encoded/decoded content is exemplified as video, but the kind of content is not limited thereto. It is apparent that various types of multimedia contents such as video and voice may be applied.

The basic technical spirit of the present invention does not define the connection relationships betweens functional units in regard to input/output signals or input/output ports but defines the connection relationships as tokens in regard to the flow of signals.

Moreover, tokens are defined with only their own names and descriptions corresponding to the minimum basic definition for data signals.

Figure 1:
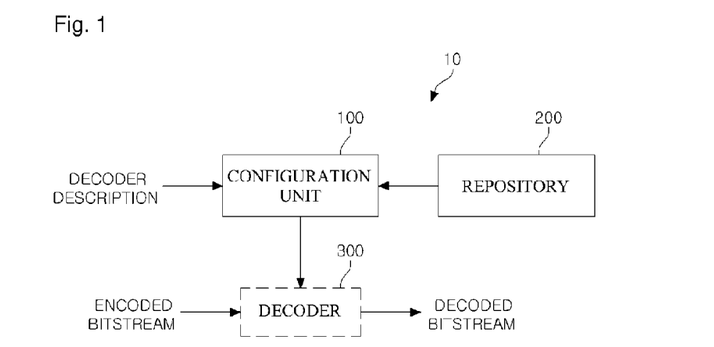
FIG. 1 is a block diagram for describing a decoding apparatus according to an exemplary embodiment.

Hereinafter, a decoding apparatus and method according to an exemplary embodiment will be described below with reference to FIGS. 1 to 7. FIG. 1 is a block diagram for describing a decoding apparatus according to an exemplary embodiment. FIGS. 2 to 6 are exemplary diagrams for describing functional units. FIG. 7 is a flow chart for describing a decoding method according to an exemplary embodiment.

Referring to FIGS. 1 to 7, a decoding apparatus according to an exemplary embodiment may include a configuration unit 100 and a repository 200 (for example, a Video Tool Library (VTL)). The configuration unit 100 receives Decoder Description (DD) for configuring a decoder 300 that decodes an encoded bitstream in operation 5310, and selects at least one functional unit from the repository 200. The configuration unit 100 connects the selected functional units to configure the decoder 300 suitable for decoding an encoded signal. Since the decoder 300 has variable characteristic in which it is reconfigured according to the decoder description, it will be referred to as a variable decoder for clearly discriminating with a related art decoder hereinafter.

The decoder description includes the names of functional units (see FIG. 2) necessary for configuring the variable decoder 300 that decodes an encoded bitstream, and connection information for connecting the functional units. A plurality of functional units are stored in the repository 200.

The following description will be made with reference to FIG. 7 on an operation in which the configuration unit 100 configures the variable decoder 300.

The decoder description includes Parser Description (PD) being information necessary for configuring a parser functional unit that parses an input bitstream, and FU network description (FND) being connection information necessary for connecting the functional units. When the configuration unit 100 receives the decoder description in operation S310, it generates the parser functional unit on the basis of the parser description in operation S320. The configuration unit 100 selects one or more functional units from the repository 200 on the basis of the FND, and connects the selected functional units to configure a decoding logic that is configured with the functional units in operation S330.

The decoding apparatus 10 configures the variable decoder 300 by using the parser functional unit and the decoding logic to be included in operation S340.

In configuring the variable decoder 300, unlike the above described, the decoding apparatus 10 may use content stored in the repository 200 without generating the parser functional unit. In this case, the parser description may include only the name or identifier of the parser functional unit.

As described above, in configuring the variable decoder, the present invention may be modified in various forms without departing from the technical subject matters of the present invention, and also the above-described operations S310 to S340 have not been described based on time series limitation.

The decoding apparatus 10 and method according to an exemplary embodiment configure the variable decoder according to the decoder description that is inputted together with an encoded bitstream even when the input bitstream is encoded in all sorts of encoding schemes, and thus can dynamically a suitable decoder based on a corresponding encoding scheme, thereby decoding signals encoded in various encoding schemes through one device.

Hereinafter, functional units and tokens will be described in more detail.

First, a token denotes a signal (i.e., data) that is transferred between the functional units, and therefore one token may naturally define the connection relationship, including the input/output relationship between two functional units, between the functional units. In an exemplary embodiment, defined are the connection relationships between the functional units that configure the variable decoder 300 by the use of one or more tokens.

A token according to an exemplary embodiment is defined with only its own name (or identifier) or its own name and identifier, and description that describes only its own characteristic discriminated with other tokens.

In an exemplary embodiment, the name of a token may be an abbreviation or a variable length word that enables to instinctively recognize the kind of the token, and an identifier may be a fixed-length number or an abbreviation for easily configuring decoder description.

Moreover, the description of a token defines only the most basic characteristic (for example, a bitstream itself and a control signal) of a signal (i.e., data), and does not define the size, transfer sequence and transmission type (for example, serial or parallel transmission) of the signal.

Figure 2:
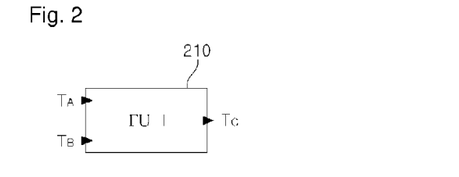
FIG. 2 illustrates a functional unit according to an exemplary embodiment.

The functional unit and the token will be described in more detail with reference to FIGS. 2B to 2E.

Figure 3:
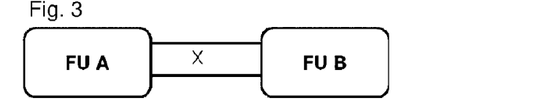
FIGS. 3 to 6 are exemplary diagrams for describing functional units.

When two tokens are connected to a token X as illustrated in FIG. 3, largely three cases will be described below according to the intent of implementation.

Figure 4:
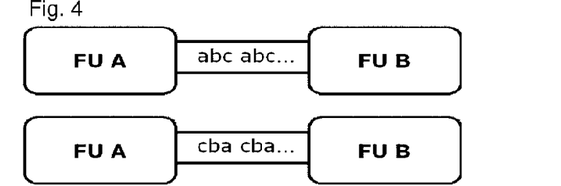

First, FIG. 4 illustrates different examples in which each token X is processed in series. The first figure of FIG. 4 prefers performing transmission in an abc type. The second figure of FIG. 4 prefers performing transmission in a cba type. If data transfer sequence has been defined when defining the token X, cases such as figures should be configured with different tokens, and moreover, since the functional unit A of the former and the functional unit A of the latter represent different outputs, they should be registered as different functional units.

Figure 5:
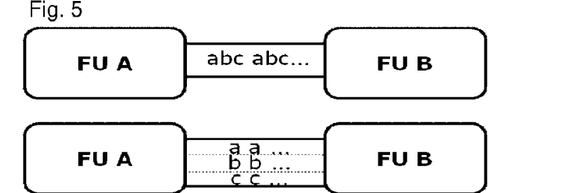

FIG. 5 illustrates examples in which each token X is processed in series and in parallel. The first figure of FIG. 5 transmits data 'abc' in series. The second figure of FIG. 5 divides the bus of the token X by three and independently transmits data 'a', data 'b' and data 'c'. In this case, the first figure may set the input/output of the token X at the size of the data 'a', and the second figure may set the input/output of the token X at the size of "a+b+c". If size has been defined when defining the token X, cases such as figures should be configured with different tokens, and moreover, since the functional unit A of the former and the functional unit A of the latter represent different outputs, they should be registered as different functional units. However, like the above-described example, this also makes the description of standard documents complex, and moreover, may enforce a specific scheme to an implementation user.

Figure 6:
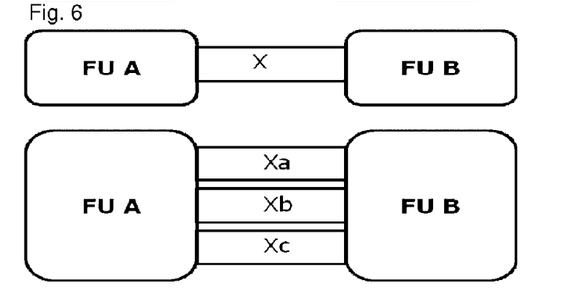
Figure 7:
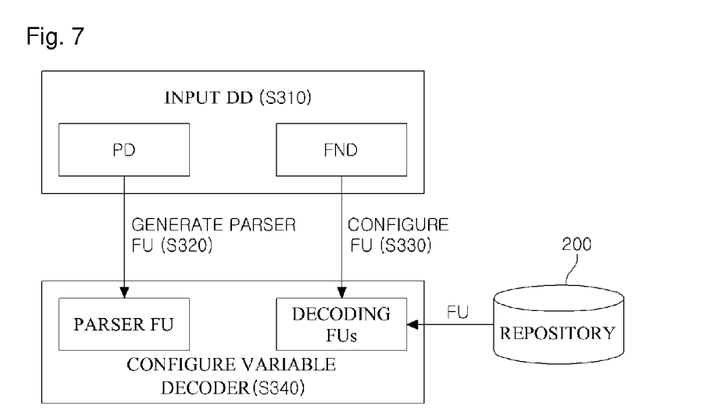
FIG. 7 is a flow chart for describing a decoding method according to an exemplary embodiment.

Next, FIG. 6 illustrates an example in which the token of a serial concept is processed in parallel at the inside. When configuring an algorithm, this case corresponds to a case which is improved in a parallel scheme that is proposed and implemented from a serial viewpoint. The former is a case that transmits the token X according to the description of an algorithm, and the latter is a case that divides into three tokens to implement parallelism. In the latter, however, in a case of internally defining as "X=Xa+Xb+Xc", i.e., a case having definition in which the token X is processed to be configured with 'Xa', 'Xb' and 'Xc' in parallel, three operations are performed at the inside but they are identically performed when seen from the outside. If parallelism has been defined when defining the token X in the standard, cases such as figures should be configured with different tokens, and moreover, since the functional unit A of the former and the functional unit A of the latter represent different outputs, they should be registered as different functional units. However, like the above-described example, this also makes the description of standard documents complex, and moreover, may enforce a specific scheme to an implementation user.

In FIG. 6, when "X=Xa+Xb+Xc" is defined as a internal regulation, because input/output results are the same, there is no need that defines this case in detail while additionally defining a functional unit in the standard.

By gathering the names (or an identifiers, or names and identifiers) and descriptions of the tokens to configure a token pool, the token pool may be used when writing decoder description and verifying a new functional unit. An example of the template of the token pool is as listed in the following Table 1, and an embodiment of the token pool may be as listed in the following Table 2.

TABLE 1

Template of Description of Token Pool

| ID | NAME | DESCRIPTION |
|---|---|---|
| Unique numerical number which represent this Token in this row | Unique name to represent this Token in this row | Some text to describe characteristics or functionality of this Token in this row |

TABLE 2

Token Pool

| ID | NAME | DESCRIPTION |
|---|---|---|
| 1 | CBP | An array of 6 Boolean values for describing whether the individual block includes one or more DCT coefficientsthat are decoded as (LAST, RUN, LEVEL) symbol |
| 2 | Quant_scale | a 5-bit integer value for describing the quantization step in the current MB, which is derived from the running QP and dQuant to calculate QP and determine dc_scaler for current MB by referring to Table 7-1 (14496-2: 2004) |
| 3 | Dquant_scale | a 2-bit code which specifies the change in the quantiser scale, for I-, P-, and S(GMC)-VOPsdquant codes and corresponding values: (ISO/IEC 14496-2 Table 6-32)dquant_scale = 00 →value = −1dquant_scale = 01 →value = −2dquant_scale = 10 →value = 1dquant_scale = 11 →value = 2 |
| 4 | AC_pred_flag | to determine the direction of inverse DC prediction |
| 5 | AltScan | Indicates zigzag or alternate scan. AltScan flag is 0 when zigzag, 1 when alternate scan. It must set every block |
| 6 | Ac_pred_dir | A flag to communicate the direction of prediction to the IAP block but also info about the scan mode of the block to the inverse scan block. AC_PRED_DIR = −2 => NEWVOP flag. AC_PRED_DIR = −1 => An uncoded block so skip inverse AC prediction. AC_PRED_DIR = 0 => No inverse AC prediction but use zig zag inverse scan. AC_PRED_DIR = 1 => Prediction form the left and use alternate vertical scan. AC_PRED_DIR = 2 => Prediction form the top and use alternate horizontal scan. |
| 7 | RefMB | A buffer of MB data to have a relation with current MB |
| 8 | MB | A MB buffer to save a target MB data |
| 9 | MB_type | Indicate the type of MB |
| 10 | Qp | Quantization parameter of an MB which is calculated in fuDCR. |
| 11 | DC_left | to compute the direction of DC/AC prediction for 6 (4 Y/1 Cb/1 Cr) block(s) |
| 12 | DC_top | |
| 13 | DC_lefttop | |

In this way, by defining tokens with only their own names (or identifiers, or names and identifiers) and descriptions, the definition of the token is abstracted, and by including only implementation-independent content, it can be prevented that standard content is limited and used to a specific company or a specific industry. Furthermore, for functional units, the functional units are defined through a separate FU table and contents for the functional units are not described in the token pool, thereby concentrating information.

By describing a token identifier (ID) instead of a token name or both the token ID and the token name in the token pool, an identifier may be used in the writing of decoder description or the configuring of a functional unit. While using a token ID, an ID-Name map may be used for again recovering as a name. In this case, a functional such as "IDToName( )/NameToID( )" may be included.

A functional unit stored in the repository 200 has its own connection information for the configuring and verification of a variable decoder based on decoder description.

That is, each functional unit has information for the kind of an input/output signal that may be processed by it and information for the number of input/output ports. This information may be defined with only tokens.

To provide a description through an example with reference to FIG. 2 and the Table 1, the functional unit 210 has two input ports and one output port. When the functional unit 210 receives and processes signals corresponding tokens TA and TB to output a signal corresponding to a token TC, it may be defined as follows.

FU I
Input: TA, TB
Output: TC

That is, the input port and output port of each functional unit may be defined as tokens. In other words, by defining the input/output relationship between functional units from a data viewpoint instead of an interface viewpoint, the complexity of connection information decreases and verification may be performed.

By configuring connection information for each functional unit (i.e., input/output relationship information) with only a token, the configuration unit 100 may quickly configure the variable decoder 300 on the basis of decoder description and may verify whether the connection between the functional units is suitable in configuring. As described above, since the input port and output port of each functional unit is defined as tokens, the connection information for the each functional unit may be defined as a token and the information (for example, the identifiers of input port and output ports) of the input port and output port of the each functional unit. A detailed description associated with this will be made below with reference to FIG. 8.

Since the possibility of connection between a specific functional unit and another functional unit may be verified beforehand owing to the definition of a token, the functional unit of another codec may be used. Furthermore, if a new specific codec is defined and only the structure of a token based on it is defined, the suitability of the codec may be verified. A conformance test may be made in a codec level. For example, a bitstream is generated by encoding through a self-algorithm, and decoder description suitable for the bitstream is transferred to a decoder. The self-algorithm may add some functional units to the existing codec or may be subtracted some functional units from the existing codec. This may be performed at any time when only decoder description is analyzed and the suitability of a token used in it is determined. This characteristic has a meaning that may flexibly meet a new codec to be emerged in the future.

Functional units may have a case in which signals inputted to the respective input ports of the functional units are sequence-dependent. For example, when a token $T_A$ is a flag, a token $T_B$ is a pixel signal and the functional unit 210 is implemented so that it may receive a token $T_B$ to operate after the token $T_A$ is first inputted, connection information for the functional unit 210 includes token precedence information that represents operation characteristic such as "$T_A > T_B$", and thus definition may be clearly made with only a token even in a case where the operation characteristic of a functional unit is sequence-dependent of an input signal. Herein, '>' represents precedence between two or more tokens, and is used to denote a case of being relatively first inputted. To provide a description through another example, when a functional unit is implemented so that it may receive tokens $T_{B1}$ and $T_{B2}$ to operate after token $T_A$ is first inputted, the token precedence of the functional unit may be defined as "$T_{A1} > (T_{B1}, T_{B2})$". Herein, ',' denotes that tokens $T_{B1}$ and $T_{B2}$ should be inputted together at a specific moment. To provide a description though another example, when token precedence is defined as "$T_A > (T_{B1}, T_{B2*})$", this means that a token $T_A$ should be inputted before tokens $T_{B1}$ and $T_{B2}$ but the token $T_{B2}$ may not be inputted. That is, '*' denotes not being used or connected depending on cases. That is, in a case where connection between at least one of the input port and output port of the functional unit and another functional unit is optional, option information for connection with the other functional unit may be displayed using a token like $T_{B2*}$. In this case, the functional unit may be defined as the token and the option information. Moreover, the configuration unit 100 may selectively connect the functional units by using the token and the option information, and in operation S340 of configuring a variable decoder, the configuration unit 100 may select and connect a functional unit on the basis of the token and the option information. However, such grammatical contents representing the token precedence are not limited thereto, and may be further added.

In other words, when each functional unit operates according to the sequence of a token that is inputted to an input port, the operation of the functional unit is defined as the sequence of the token, and the sequence of the token is indicated through the name or identifier of the token.

The above-described description on the connection information included in the functional unit may be charted as a functional unit table like the following Table 3.

TABLE 3

Function Unit Table

| | | Description | | |
|---|---|---|---|---|
| Number | Name | Input | Output | Token Precedence |
| 1 | FU I | $T_A$ $T_B$ | $T_C$ | TA > TB |
| 2 | FU II | $T_C$ | $T_D$ $T_E$ | |
| ... | ... | ... | ... | ... |
| 10 | FU X | $T_D$ or $T_E$ | $T_F$ or $T_G$ or $T_H$ | ... |
| ... | ... | ... | ... | ... |

As listed in the Table 3, the input port and output port of each functional unit and the characteristic of an input/output signal (i.e., data) may be simply defined as a token.

Two or more tokens may be inputted to the one input port of a functional unit, and also two or more tokens may be outputted from one output port. In this case, like the description of the FU X described in the Table 2, an operation may be defined as a group "($T_D$ or $T_E$), ($T_F$ or $T_G$ or $T_H$)".

In this way, since the each functional unit operates like the defined in description, different token inputs may be discriminated. A token and the operation of a functional unit will be additionally described below with reference to FIGS. 4A to 4C.

Tokens are identical, which means equivalence. When not equivalence, tokens should be different from one another.

Figure 8:
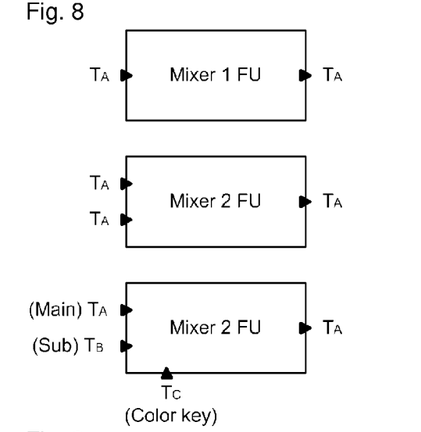
FIGS. 8 to 10 are exemplary diagrams for describing the operations of functional units.

In FIG. 8, a mixer 1 FU receives a token $T_A$ to again output a token $T_A$. When the token $T_A$ is a video input, the mixer 1 FU may perform image processing such as filtering or add a caption. Tokens $T_A$ perform certain operations, but the tokens $T_A$ are equivalent in regard to input/output data. That is, since the types of input/output data are the same although the contents of the input/output data are different, the tokens $T_A$ are equivalent because they do not get out of abstract meanings that are defined. A mixer 2 FU receives two tokens $T_A$ as inputs to output one token $T_A$. This corresponds to a case in which the mixer 2 FU receives different audios to perform a mixing operation when the token $T_A$ has an audio type. The audio mixing operation enables to listen window sound, Compact Disk (CD), microphone and line inputs through one speaker, in personal computers (PCs). In this case, it is apparent that the tokens $T_A$ of inputs/outputs are equivalent. On the other hand, in a case where video is applied to a mixer 3 FU as an example, the mixer 3 FU receives a color key through a token $T_C$ input and applies the color key to the input of a token $T_B$ to perform transparency processing. In this case, the input of the token $T_B$ is overlaid with the input of the token $T_A$ and may be outputted as the type of a token $T_A$. Herein, since the token $T_A$ and the token $T_B$ perform different functions such as a main and a sub, they are not equivalent. If the mixer 3 FU defines a token $T_B$ as a token $T_A$ like the mixer 2 FU, the token $T_B$ may be included in the main or the sub when it is connected to the token $T_A$ output of the mixer 2 FU. An output different from an output, desired by the mixer 3 FU, may arise.

The internal operation of a functional unit is not known to the outside, and only characteristic for using the functional unit is known to the outside through a token and token precedence. Considering this characteristic, the mixer 3 FU should define different tokens in locations where different inputs are desired and thereby divide undesired inputs. In other words, the functional unit should perform all functions for token input/output that is clarified by it.

Figure 9:
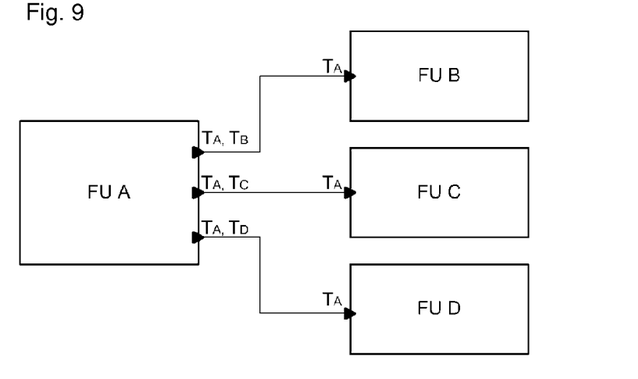

Referring to FIG. 9, an FU A has three outputs, which are designated as the type of a token group such as "($T_A$ or $T_B$), ($T_A$ or $T_C$), ($T_A$ or $T_D$)". Because an FU B, an FU C and an FU D use tokens $T_A$ as inputs, when the FU A is connected to the FU B, the FU C and the FU D through the tokens $T_A$, equivalent output is made for all three outputs.

Figure 10:
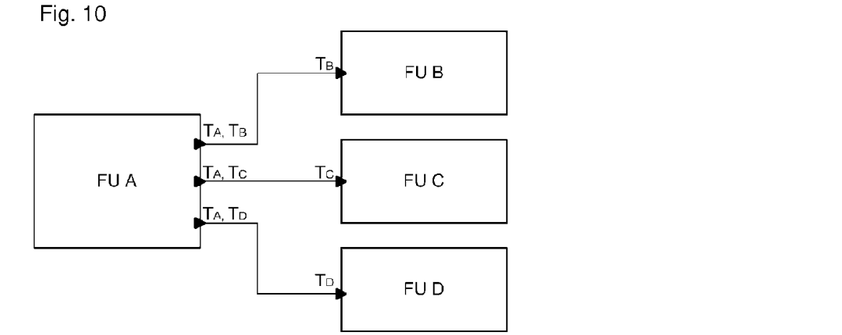

Referring to FIG. 10, unlike FIG. 9, because an FU B, an FU C and an FU D respectively use a token $T_B$, a token $T_C$ and a token $T_D$, an FU A is respectively connected to the FU B, the FU C and the FU D through the token $T_B$, the token $T_C$ and the token $T_D$. As described above, because each functional unit should perform all functions for token input/output that is clarified by it, the FU A performs different outputs instead of the equivalent output of the token $T_A$, for each output. In other words, although the inside of the FU A is not known, the FU A may perform equivalent output and sometimes perform output by changing a format to another format. For this, the FU A may be used. As an actual example, the FU A basically outputs RGB, but it may divide RGB into R, G and B to output them according to the FU B, the FU C and the FU D that are connected to it.

To provide a brief description, as listed in the Table 1, a token is defined with only an identifier and description in a token pool, and consequently, the connection information of a functional unit may be simply defined with only a token as listed in the Table 2. Moreover, as described above, since the input port and output port of each functional unit are defined as tokens, connection information for the each functional unit may be defined as information (for example, the identifiers of input and output ports) for the input port and output port of the each functional unit.

As listed in the Table 2, the connection information of a plurality of functional units may be recorded in one lookup table, and each functional unit may store its own connection information.

In a case of using a token according to an exemplary embodiment, the writing of decoder description becomes very easy, and the configuring of the variable decoder 300 may be quickened and simplified.

For example, when intending to configure the variable decoder in FIG. 8, only the following content is described in the FND of decoder description.

<Example of DD>
Parser FU-FU III (TA)
Parser FU-FU II (TB)
FU III-FU V (TC)
FU II-FU V (TD)

That is, a DD writer does not care that each functional unit inputs/outputs a signal having a certain size and sequence in which input sequence and in which transmission scheme (for example, serial or parallel transmission), and merely cares the processing function and connection information of the each functional unit.

Considering a broadcasting environment that may become an example of dynamic reconfiguration, a bitstream transmitted from a broadcasting station may not be limited to the product and device of a specific company. In other words, the same decoder description and a bitstream may be transmitted irrespective of a bitstream that is written based on a serial scheme and a bitstream for a parallel scheme. If decoder description is written to be limited to a serial scheme or a parallel scheme, it should be differently transmitted depending on cases, and consequently, a case incapable of viewing sometimes may occur in a specific product. Accordingly, only the minimum element should be defined in decoder description, and implementation-dependent characteristic is not reflected in a token that is designated by the decoder description. Through this, decoder description identically operates in a design-time stage for producing a VTL and a run time that is actually used by a user.

The configuration unit 100, which analyzes decoder description to configure the variable decoder 300, sequentially selects each functional unit according to the described in decoder description and sets connection between the functional units, thereby configuring the variable decoder 300 in a simple scheme.

Particularly, the configuration unit 100 can easily verify whether connection information, described in decoder description, is suitable.

For example, when "[FU III-FU V (TC)]" is described in the FND of decoder description, the configuration unit 100 may check whether a token TC is in the output-enabled signal (i.e., a token) of an FU IR and the input-enabled signal of an FU V on the basis of the connection information (for example, content described in the Table 2) between the FU III and the FU V to verify whether connection is suitable, appropriately meeting a result of the verification.

When the token TC is not in the output-enabled signal (i.e., a token) of an FU III or the input-enabled signal of an FU V, the configuration unit 100 checks that the FND of decoder description is wrongly described to output an error message, and may stop configuring the variable decoder 300. The configuration unit 100 may include a verification unit (not shown) for this.

As described above, by defining the connection information of a functional unit with only a token, a functional unit or an FU table itself is easily understood, and by unifying the connection medium between a token pool and functional units with a token name (or an identifier), the disaccord of information is prevented in advance and the efficiency of information concentration is improved. Furthermore, by allowing the repetitive description of a token for a functional unit, a corresponding function may have generic characteristic. Through this, a base that may concentrate at the technical feature of a functional unit and integrate similar functional units can be prepared.

In an exemplary embodiment, as a premise condition, the implementation of a functional unit is made in one company or one party that shares the reference of FU implementation.

That is, since a DD writer or the configuration unit 100 never considers the detailed processing operation of a functional unit, the detailed format of an input/output signal (i.e., data), a transmission scheme (for example, serial or parallel transmission) and the internal sequence of a signal, an FU producer should implement a functional unit while autonomously defining the detailed format of a signal (i.e., data) that is inputted/outputted between functional units to be stored together in one repository, a transmission scheme (for example, serial or parallel transmission), the internal sequence of a signal, connectable functional units and the processing algorithm of each functional unit.

Due to these, the producer of a functional unit secures flexibility for contents other than a token, and thus can produce various types of functional units through various schemes. Accordingly, technologies for functional units can further progress.

According to an exemplary embodiment, an FU producer may determine the interface scheme between functional units without being limited by a signal transfer sequence, the classification of the serial/parallel scheme and input/output scheme of a signal and size. For example, since a signal transfer sequence, the classification of the serial/parallel scheme and input/output scheme of a signal and size in a case of configuring a functional unit in hardware may differ from those of a case of configuring a functional unit in software, each FU producer may determine a processing standard and a detailed signal suitable for an FU implementation scheme that is selected by it. Alternatively, each FU producer can make the implementation of a high-performance FU flexible by using its own special know-how.

To provide a summary on the above described, when generating decoder description in an encoding operation, by referring to a token pool and an FU table, functional units necessary for implementing a decoder and a token for connecting these can be easily comprehended and generated. At this point, a decoder to be configured with a functional unit and a token can be easily verified. This is because the connection relationships between functional units are clearly emerged with tokens. Moreover, since decoder description is generated using the identifier of a token and the identifier of a simplified and unified functional unit, the capacity of the decoder description may be reduced. Therefore, the transmission efficiency of the decoder description can increase.

Moreover, because the configuration unit 100 connects functional units with the simple identifier of a token, it can be configured with a simple logic.

Since the connection information of a functional unit is only composed of the identifier of a token, functional units having the same characteristic may be determined as one FU regardless of an interface scheme other than a token, for example, a data transfer sequence, the classification of a serial/parallel transmission scheme and size for a token.

In a case of defining a functional unit on the basis of a data transfer sequence, the classification of a serial/parallel transmission scheme and size for a token, a functional unit of performing the same processing function should also be defined in plurality according to a data transfer sequence, the classification of a serial/parallel transmission scheme and size. Moreover, a plurality of functional units for performing the same processing function should be stored in a repository. In an exemplary embodiment, however, since the connection relationships of functional units are defined with only tokens, the connection information of the functional units are simplified and plural numbers are not required in functional units having the same characteristic, preventing the capacity of a repository from unnecessarily increasing.

In a standardization level, since a data transfer sequence, the classification of a serial/parallel transmission scheme and size for a token are not considered and only tokens are considered, all users can easily know the standard content and easily use the standardized technology.

Moreover, when defining a new functional unit is required, by first checking whether a token exists in the token pool of the Table 1, whether a usable token exists in a new functional unit is first determined. When the usable token exists, this means that the new functional unit may be connected to another functional unit, and thus the new functional unit may be immediately used. When the usable token does not exist, a new token is defined with only a name or an identifier and description, and the connection information of the new functional unit may be defined using the defined token and used.

In this way, by defining a token with only an identifier and description and defining a functional unit with the token, information for a token pool, an FU table, tokens and functional units may be concentrated and unified.

Hereinafter, a decoding apparatus and method according to exemplary embodiments will be described in detail through specific embodiments.

Figure 11:
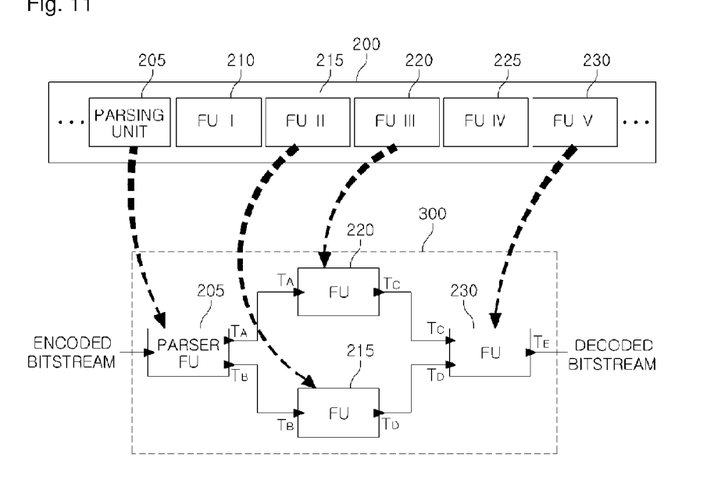
FIG. 11 is a conceptual view for describing a decoding apparatus according to an exemplary embodiment.

First, a decoding apparatus and method according to an exemplary embodiment will be described below with reference to FIGS. 1 to 11. FIG. 11 is a conceptual view for describing a decoding apparatus according to an exemplary embodiment.

Referring to FIGS. 1 to 11, the configuration unit 100 receives decoder description to configure a variable decoder 300. Herein, decoder description may include the identifier (for example, a numeral or a name for discriminating functional units) of a functional unit that is used in the variable decoder 300, FU connection-relationship information (i.e., an FND) that is composed of the identifier (for example, a numeral or a name for discriminating tokens) of a token for connecting functional units, and parser description.

First, the configuration unit 100 refers to the parser description included in the decoder description, and when a parser functional unit 205 corresponding to the parser description exists in the repository 200, the configuration unit 100 selects and positions the parser functional unit 205 from the repository 200. Herein, the parser functional unit 205 parses another encoded bitstream and provides parsed signals to other functional units. For example, the parser functional unit 205 parses an encoded bitstream into a control signal for decoding and an encoded video signal to provide the parsed signals to other functional units. Next, among a plurality of functional units 210, 215, 220, 225 and 230 that exist in the repository 200, the functional units 215, 220 and 230 corresponding to the identifiers of functional units are selected from the repository 200 and are positioned. The parser functional unit 205 and the functional units 215, 220 and 230 are connected using the identifiers of tokens.

In more detail, the configuration unit 100 selects the parser functional unit 205 having output ports that are defined as a token $T_A$ and a token $T_B$, from the repository 200 and positions the selected parser functional unit 205 as illustrated in FIG. 11. Furthermore, as illustrated in FIG. 11, the configuration unit 100 positions the FU III 220 having an input port and an output port that are respectively defined as a token $T_A$ and a token $T_B$, positions the FU II 215 having an input port and an output port that are respectively defined as a token $T_B$ and a token $T_D$, and positions the FU V 230 having input ports that are defined as a token $T_C$ and a token $T_D$ and an output port that is defined as a token $T_E$. Subsequently, the configuration unit 100 connects the parser functional unit 205 and the functional units 215, 220 and 230 by using each token identifier.

In an operation where the configuration unit 100 selects the functional units 215, 220 and 230 from the repository 200, the configuration unit 100 may verify in advance whether the functional units 215, 220 and 230 may be connected by using the names or identifiers (for example, $T_A$, $T_B$, $T_C$, $T_D$ and/or $T_E$) of tokens. As described above, since the configuration unit 100 generates decoder description on the basis of the input/output port token information and token precedence information of a functional unit necessary for implementing the variable decoder 300 based on the FU table of FIG. 2 even in an operation of generating the decoder description, it can verify beforehand whether functional units may be connected.

Figure 12:
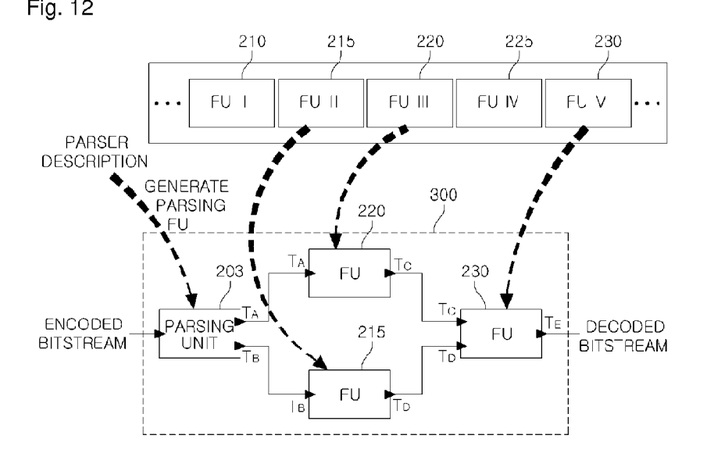
FIG. 12 is a conceptual view for describing a decoding apparatus according to another exemplary embodiment.

Next, a decoding apparatus and method according to another exemplary embodiment will be described below with reference to FIGS. 1 to 12. FIG. 12 is a conceptual view for describing a decoding apparatus according to another exemplary embodiment.

In this embodiment, unlike the above-described embodiment, the parser functional unit 205 does not exist in the repository 200. In this case, the configuration unit 100 generates a parser functional unit 205 by using the parser description of decoder description. The configuration unit 100 positions the generated parser functional unit 205, and selects and positions other functional units 215, 220 and 230. Subsequently, the configuration unit 100 connects the parser functional unit 205 and the functional units 215, 220 and 230 by using the names or identifiers (for example, $T_A$, $T_B$, $T_C$, $T_D$ and/or $T_E$) of tokens to configure a decoder 300.

For appropriately performing the above-described decoding, the following encoding scheme is required.

After encoding a bitstream to transmit or determining an encoding scheme, a functional unit for performing decoding corresponding to the encoding scheme should be extracted from a functional unit table.

When functional units are selected/extracted, the decoding apparatus sets the connection relationship between the functional units and generates decoder description in which the connection relationship is described. Subsequently, the decoding apparatus may merge and transmit an encoded bitstream and the decoder description.

In an operation of setting the connection relationship between the functional units, the decoding apparatus extracts a token capable of the input or output of the extracted functional unit on the basis of a token pool, checks whether the extracted token may be used in common between two functional units to be connected, and defines the connection relationship between the functional units by using the names or identifiers of two functional units to be connected and the token when the extracted token may be used in common.

At this point, when the token may not be used in common between the two functional units, the decoding apparatus extracts another functional unit for replacing at least one of the two functional units, and checks whether the replaced functional unit and a functional unit to be connected with it may use a token in common. In this case, by repeating these operations until it is checked that the token may be used in common between the two functional units, the decoding apparatus can set the suitable connection relationship between functional units.

According to another exemplary embodiment, even in an encoding operation, verifying the suitability of the connection relationship between functional units can be easily performed.

The above-described decoding apparatus and method according to exemplary embodiments may be implemented or executed through a program, and the program may be stored in a computer-readable storage medium.

The invention can also be embodied as computer readable codes on a computer-readable storage medium. The computer-readable storage medium is any data storage device that can store data which can be thereafter read by a computer system. Examples of the computer-readable storage medium include ROMs, RAMs, CD-ROMs, DVDs, magnetic tapes, floppy disks, registers, buffers, optical data storage devices, and carrier waves (such as data transmission through the Internet). The computer-readable storage medium can also be distributed over network coupled computer systems so that the computer readable codes are stored and executed in a distributed fashion. Also, functional programs, codes, and code segments for accomplishing the present invention can be easily construed by programmers skilled in the art to which the present invention pertains.

A number of exemplary embodiments have been described above. Nevertheless, it will be understood that various modifications may be made. For example, suitable results may be achieved if the described techniques are performed in a different order and/or if components in a described system, architecture, device, or circuit are combined in a different manner and/or replaced or supplemented by other components or their equivalents. Accordingly, other implementations are within the scope of the following claims.

INDUSTRIAL APPLICABILITY

A decoding apparatus and method according to exemplary embodiments may be applied to a Reconfigurable Video Coding (RVC) technology.

The invention claimed is:
1. A decoding apparatus comprising:
a configuring unit receiving a decoder description which comprises an identifier of at least one function unit comprising at least one input port and/or one output port and processing a bit stream in a decoding operation and connection information for connecting the at least one function unit one another, selecting at least one corresponding function unit from a plurality of function units using the identifier of the at least one function unit, and connecting the selected at least one corresponding function unit one another using the connection information to configure a variable decoder,
wherein each of the plurality of function units is characterized by at least one token comprising first information about whether at least one signal transmitted to or from the each function unit is an input signal or an output signal of the each function unit and second information about a number of the at least one signal, and wherein the at least one token does not comprise information about the at least one function unit other than the first information and the second information.

2. The decoding apparatus of claim 1, wherein the at least one token does not comprise information about a size and transfer order of the at least one signal and a serial or parallel transmission type of data transmitted through the at least one signal.

3. The decoding apparatus of claim 1, wherein, the decoder description further comprises a parser description comprising parsing information about the bit stream, and the configuring unit selects a parser function unit corresponding to the parser description from the plurality of function units and connects the selected parser function unit and the selected at least one corresponding function unit to configure the variable decoder.

4. The decoding apparatus of claim 1, wherein the at least one token comprises a plurality of token, wherein information about the input signal or the output signal is represented by the plurality of tokens and an input or output order of the plurality of tokens is dependent, and wherein the at least one function unit is further characterized by priority information between the plurality of tokens.

5. The decoding apparatus of claim 1, wherein the configuring unit comprises a verifier which checks input and output signal information, represented by the at least one token of the selected at least one corresponding function unit, to verify whether the connection information is suitable.

6. A decoding method comprises:

receiving a decoder description which comprises:
an encoded bit stream;
an identifier of at least one function unit comprising at least one input port and/or one output port and processing the bit stream in a decoding operation; and
connection information for connecting the at least one function unit one another;

selecting at least one corresponding function unit from a plurality of function units using the identifier of the at least one function unit; and connecting the selected at least one corresponding function unit one another using the connection information to configure a variable decoder for decoding the bit stream, wherein each of the plurality of function units is characterized by at least one token comprising first information about whether at least one signal transmitted to or from the each function unit is an input signal or an output signal of the each function unit and second information about a number of the at least one signal, and wherein the at least one token does not comprise information about the at least one function unit other than the first information and the second information.

7. The decoding method of claim 6, wherein the configuring a variable decoder comprises:

extracting a parser description from a decoder description, the parser description comprising parsing information about the bit stream; and selecting a parser function unit corresponding to the parser description from the plurality of function units, and connecting the selected parser function unit and the selected at least one corresponding function unit.

8. The decoding method of claim 6, further comprising:

checking input and output signal information which is represented by the at least one token of the selected at least one corresponding function unit; and verifying whether the connection information is suitable, on the basis of the input and output signal information which is represented by the at least one token of the selected at least one corresponding function unit.

9. The decoding method of claim 6, further comprising:

extracting priority information between the at least one token, of the at least one function unit, comprising a plurality of tokens, wherein the input signal or the output signal is represented by the plurality of tokens; and processing the at least one signal on the basis of the priority information.

10. An encoding method comprises:

encoding a bit stream;

generating a decoder description which comprises connection information for connecting a plurality of function units one another, each function unit comprising at least one input port and/or one output port and processing a bit stream in a decoding operation in response to the encoding scheme; and merging and transmitting the encoded bit stream and the decoder description, wherein each of the plurality of function units is characterized by at least one token comprising first information about whether at least one signal transmitted to or from the each function unit is an input signal or an output signal of the each function unit and second information about a number of the at least one signal, and wherein the at least one token does not comprise information about the at least one each function unit.

11. The encoding method of claim 10, further comprising:

verifying whether the connection information is suitable, on the basis of a token table configured with the at least one token comprising a plurality of tokens and a function unit table configured with the plurality of function units.

* * * * *